2,855,309

METHOD OF PUFFING BACON RINDS

Mauritz G. Anderson, Wheaton, and Charles F. Smith, Prospect Heights, Ill., assignors to Swift & Company, Chicago, Ill., a corporation of Illinois No Drawing. Application February 26, 1957
Serial No. 642,359

3 Claims. (Cl. 99—107)

The present invention relates to a method of treating bacon rinds and, more particularly, to the preparation of edible products from bacon rinds.

Although bacon rinds (pork skins) ordinarily have a tough, leathery consistency, it has long been known that these materials can be treated to produce edible "cracklings." In conventional methods, "cracklings" are prepared from cured and smoked pork skin pieces which have been rendered either in a 100° F. to 275° F. oil bath for 2 to 3 hours, or in steam or hot water for lesser periods of time. After rendering, the skins are immersed in oil heated to about 400° F., where they either puff to several times their original size or remain hard and tough. Those pieces that puff satisfactorily are crisp and have a mild bacon flavor. Those pieces that do not puff, however, are substantially inedible and represent a loss of yield. This loss generally amounts to from about 15 to about 40% of the total treated skins. Understandably, such a large percentage of unsatisfactory "cracklings" is highly undesirable, and represents a serious problem to commercial processors.

The principal object of the present invention, therefore, is to provide a method of preparing edible products from bacon rinds which substantially eliminates this loss of yield.

Other objects not specifically set forth will become apparent from the following detailed description.

Generally, the present invention comprises the discovery that the problem of non-puffable rinds can be almost entirely eliminated by treating the rinds with particular acid solutions prior to the puffing step. More specifically, if cured pork skin pieces are immersed in certain acetic acid solutions for at least about 15 seconds, substantially all of these skins will then puff when subsequently treated with hot oil.

Experiments have demonstrated that it is possible to microscopically distinguish pork skins which will produce edible "cracklings" using conventional methods from skins which will not puff properly after such treatments. This observation gave rise to the conclusion that the ability of certain bacon rinds to puff depended on the histological state of the skin prior to processing and not on variables found in those methods of processing now practiced in the industry.

Properly prepared bacon rinds will puff whenever moisture within the skin is subjected to vapor producing temperatures. Most of the moisture needed for puffing is taken up and held in gelatinous material which forms as a result of the breakdown of the collagenous connective tissue found in the dermal layer of the skin. A second type of connective tissue (reticular), however, strengthens the rinds and often prevents the skins from rupturing properly. In order to insure that a substantially 100% yield of product will be obtained, therefore, the skins should:

(1) Contain collagenous connective tissue which has gelatinized;

(2) Have the correct amount of residual moisture; and (3) The recticular connective tissue should not be present in amounts great enough to prevent satisfactory puffing.

It has been found that the above requirements for proper puffing can be satisfied by treating the skins with particular acid solutions before the rind pieces are "exploded" in hot oil. The subject method not only produces satisfactory puffing from skins which would not puff under conventional methods, but additionally, the treatment enhances product flavor and consistency.

The following examples are illustrative of the subject invention and are not to be considered restrictive thereof:

*Example I*

Assorted sections of two cured and smoked skins (rinds) which previously had not puffed when processed by standard methods, were immersed in a boiling solution of 10 percent acetic acid and in a room temperature solution of 10 percent acetic acid for from one to five minutes. The hot oil puffing step was then repeated.

| Acid Treatment Time | Boiling Acid Solution | 70° F. Acid Solution |
|---|---|---|
| 1 min | Good Puff | Unsatisfactory—hard. |
| 3 min | Unsatisfactory—leathery | Do. |
| 5 min | do | Fair Puff. |

In addition to demonstrating that the present method will increase product yield, the above tests also illustrated the interdependence of solution temperatures and treatment times. Where boiling solutions of 10 percent acetic acid are used, for example, satisfactory results can be obtained by immersing the skins in the acid for from about 15 seconds to about 90 seconds. When the solution temperature is lowered to 70° F., however, the immersion time should be lengthened to 5 minutes or more. Preferably, the acid solutions should be heated to from about 100° F. to about their respective boiling points. The time of treatment, of course, will vary inversely in relation to the temperature of the solution, and will vary directly according to the acid concentration. Schematically, this may be shown as follows:

$$\begin{Bmatrix} \text{strong acid} \\ \text{high temp.} \\ \text{short time} \end{Bmatrix} = \begin{Bmatrix} \text{strong acid} \\ \text{low temp.} \\ \text{long time} \end{Bmatrix} = \begin{Bmatrix} \text{weak acid} \\ \text{high temp.} \\ \text{longer time} \end{Bmatrix} = \begin{Bmatrix} \text{weak acid} \\ \text{low temp.} \\ \text{longest time} \end{Bmatrix}$$

*Example II*

Bacon rinds from cured and smoked bacon bellies were mechanically cut into pieces of a desired size (preferably about ½ inch to ¾ inch wide and 3 inches to 4 inches long) after they had been sent through a fleshing machine to remove adhering fat particles. The defatted pieces were then immersed for 15 seconds in the below listed solutions of boiling acid. An examination of the skins subsequent to the rendering and puffing steps showed the following results:

| Acid | Rendering Time | Concentration and pH ||||| 
|---|---|---|---|---|---|---|
| | | 0.0%, pH 7.5 | 0.1%, pH 3.17 | 1.0%, pH 2.7 | 10%, pH 2.10 | 25%, pH 1.76 |
| Acetic CH₃CO₂H | 0 min | U—H | U—H | U—H | U—H | U—H |
| | 15 min | U—H | U—H | U—H | U—L | U—L |
| | 30 min | U—H | U—H | U—H | U—L | U—L |
| | 45 min | U—H | U—H | U—L | U—L | U—L |
| | 60 min | U—H | U—H | S | S | U—L |
| | 3 hrs | U—H | U—H | S | S | U—L |
| | | 0.0%, pH 7.5 | 0.0025%, pH 4.05 | 0.025%, pH 2.85 | 0.1%, pH 1.64 | 1.0%, pH 0.43 |
| Hydrochloric HCl | 0 min | U—H | U—H | U—H | U—H | U—L |
| | 15 min | U—H | U—H | U—H | U—H | U—L |
| | 30 min | U—H | U—H | U | U | U—L |
| | 45 min | U—H | U—H | S— | S— | U—L |
| | 60 min | U—H | U—H | S— | S— | U—L |
| | | 0.0%, pH 7.5 | 0.05%, pH 3.9 | 0.1%, pH 1.69 | 1.0%, pH 1.38 | 10%, pH 0.7 |
| Phosphoric H₃PO₄ | 0 min | U—H | U—H | U—H | U—H | U—L |
| | 15 min | U—H | U—H | U—H | U—H | U—L |
| | 30 min | U—H | U—H | U—H | U—H | U—L |
| | 45 min | U—H | U—H | U—H | U—H | U—L |
| | 60 min | U—H | S—H | S—H | F | U—L |
| | | pH 7.5 | pH 3.5 | pH 2.5 | pH 2.0 | pH 1.5 |
| Citric C₆H₈O₇ | 0 min | U—H | U—H | U—H | U—H | U—H |
| | 15 min | U—H | U—H | U—H | U—H | U—H |
| | 30 min | U—H | U—H | U—H | U—H | U—H |
| | 45 min | U—H | U—H | U—H | U—H | U—H |
| | 60 min | U—H | U—H | U—H | U—H | U—H |

U = Unsatisfactory puff.  S = Satisfactory (excellent) puff.
H = Hard.  S— = Fair puff.
L = Leathery.  F = Fair to poor puff.

As is evident from the above data, certain acids such as citric acid have no apparent effect on pork skins. The tests also show that hydrochloric and phosphoric acids do not improve puffing nearly as much as do acetic acid solutions.

*Example III*

Mechanically defatted skins were dipped in boiling solutions of 10 percent acetic acid for 15 seconds at various places in the usual cure-smoke-render-puff procedure. The following table set forth a comparison of the product obtained in each variation of the present method with "cracklings" produced by conventional processes.

Normal procedure: Puff
1. Green skins—treatment_____Not satisfactory.
2. Cured skins—treatment_____Improved—Good.
3. Smoked skins—treatment_____Improved—Best.
4. Rendered skins—treatment____Improved—Good.
5. Puffed skins.

It is clear that the acid treatment improves the final product in all cases except where green skins are used. The best place for the treatment, however, was found to be between the smoking and rendering steps.

*Example IV*

The following experiment was conducted to determine the minimum amount of time needed for rendering after skins prepared as shown in Example II were treated for 15 seconds with a 10 percent boiling acetic acid solution:

| Rendering Time at 240° F. | Treated or Control | Puffing Results |
|---|---|---|
| 0 min | T | U |
| 0 min | C | U |
| 30 min | T | F |
| 30 min | C | U |
| 60 min | T | S |
| 60 min | C | F |
| 85 min | T | S |
| 85 min | C | F |

U = Unsatisfactory.  F = Fair.  S = Satisfactory.

A rendering time of 1 hour or less at 240° F. is sufficient where the skins have previously been treated in accordance with the present method. This contrasts with rendering times of from 2 hours to 3 hours, which are needed in most of the procedures currently practiced.

In the preferred method of the subject invention, cured and smoked pork skin pieces are prepared for the puffing step by immersing them in boiling 10 percent solutions of acetic acid for at least about 15 seconds. After the rinds have been treated with the solution, they may be washed in cold water in order to eliminate excess acid. The washing step can also take place after the rinds have been puffed in hot oil. Unless the acid solution is highly concentrated, however, the washing operation can be dispensed with without materially lowering the quality of the product.

Although the above conditions are preferred, it should be remembered that they can be varied substantially and still produce an improved product. As was schematically shown above, for example, strong (concentrated) acid solutions and high temperatures shorten treatment times, whereas longer treatment periods are required with weak solutions and low temperatures.

Obviously many modifications and variations of the invention as hereinbefore set forth may be made without departing from the spirit and scope thereof, and therefore, only such limitations should be imposed as are indicated in the appended claims.

We claim:

1. An improvement in a method of preparing edible products from bacon rinds wherein said rinds are puffed in hot oil which comprises: immersing said rinds for at least about 15 seconds in a solution containing at least about 1 percent acetic acid prior to said puffing step, which solution is maintained at a temperature of from about 70° F. to about the boiling point of the solution.

2. An improvement in a method of preparing edible products from bacon rinds wherein said rinds are puffed in hot oil which comprises: immersing said rinds for from about 15 seconds to about 5 minutes in a solution containing at least about 1 percent acetic acid prior to said puffing step, which solution is maintained at a temperature of from about 100° F. to about the boiling point of the solution.

3. An improvement in a method of preparing edible products from bacon rinds wherein said rinds are puffed in hot oil which comprises: immersing said rinds in a 10 percent solution of acetic acid prior to said puffing step, which solution is maintained at about its boiling point for from about 15 seconds to about 5 minutes.

References Cited in the file of this patent

UNITED STATES PATENTS

| | | |
|---|---|---|
| 2,179,616 | Darrow | Nov. 14, 1939 |
| 2,627,473 | Brissey | Feb. 3, 1953 |